United States Patent [19]

Shepherd

[11] 4,263,862
[45] Apr. 28, 1981

[54] LIGHTWEIGHT MARINE STRUCTURAL CONCRETE SYSTEM

[76] Inventor: Ned A. Shepherd, 4434 10th Ave., Rock Island, Ill. 61201

[21] Appl. No.: 968,531

[22] Filed: Dec. 11, 1978

[51] Int. Cl.³ .............................................. B63B 3/00
[52] U.S. Cl. ....................... 114/65 A; 114/68
[58] Field of Search ................. 9/6 R; 114/65 A, 68, 114/69

[56] References Cited

U.S. PATENT DOCUMENTS

| | | | |
|---|---|---|---|
| 1,224,678 | 5/1917 | Sons | 114/68 |
| 1,240,414 | 9/1917 | Brooke | 114/68 |
| 2,341,008 | 2/1944 | Yourkevitch | 114/65 A |
| 2,454,403 | 11/1948 | Palmieri | 114/65 A |
| 3,324,814 | 6/1967 | Yee | 114/65 A |
| 3,631,831 | 1/1972 | Sutherland | 114/65 A |
| 3,753,539 | 8/1973 | Moore | 114/69 X |
| 3,828,708 | 8/1974 | Gerwick, Jr. | 114/65 A |
| 3,844,239 | 10/1974 | McLaughlin et al. | 114/69 X |
| 3,883,911 | 5/1975 | Moore | 114/69 X |

FOREIGN PATENT DOCUMENTS

| | | | |
|---|---|---|---|
| 87518 | 3/1922 | Fed. Rep. of Germany | 114/65 A |
| 1513480 | 1/1967 | France | 114/68 |

*Primary Examiner*—Douglas C. Butler
*Attorney, Agent, or Firm*—Henderson & Sturm

[57] ABSTRACT

The construction of marine vessels comprised of lightweight re-enforced concrete embodying built-in buoyant elements such as closed-cell foam cores, structural steel rods, tendons, and the like, wherein the inner and outer concrete skins are composite with ribs to increase structural strength and stability so as to provide a relatively simple vessel; e.g., ships, tankers, floating piers or breakwaters, barges, etc.

12 Claims, 8 Drawing Figures

LIGHTWEIGHT MARINE STRUCTURAL CONCRETE SYSTEM

DESCRIPTION

1. Technical Field

The manufacture or construction of lightweight marine structural concrete vessels such as barges, ships, tankers, floating piers and breakwaters, etc.

2. Background Art

Although production of major marine vessels has been primarily of steel, numerous examples of patented prior art exist related to concrete and ferro-concrete vessels, some of the more significant and recent art being U.S. Pat. Nos. 3,631,831, 3,324,814 and 3,828,708. These teach, in one way or another, the utilization of form-cast concrete structures, some segmental, some precast and some unitized. It is further clear from these that the employment of pretensioned and post-tensioned wire or cable reinforcement in an acceptable way of reinforcing the concrete. In addition, various other forms of metallic reinforcement has been employed, such as wire mesh, mild steel rods and the like. Other prior art reveals the development of variations of older systems, but none has produced a really economical and lightweight structure and all lack improvements increasing the buoyancy of the vessel.

DISCLOSURE OF THE INVENTION

The improved vessel is composed primarily of thin concrete ribs, closed-cell foam cores, exterior and interior concrete skins integral with the ribs, reinforcing steel and appurtenances such as embedded armor. As the skin is composite with the ribs, it would act as beam flanges, increasing the overall strength of the vessel. The foam core would assure positive buoyancy and provide lateral stability to the ribs and structural support to the skin spanning between the ribs. The crossing of ribs also provides stability to each other and distribution of concentrated loadings. Steel or other reinforcing would provide flexural strength and crack control. Embedded steel armor would be used where known or accidental concentrated forces might occur. This would primarily be on exposed edges of the vessel. Due to the nature of the system, the inside and outside surfaces can be smoothly shaped according to hydraulic and cargo constraints without the need for forming protruding ribs or using a relatively low flexural strength slab design.

Also, the skin can be more efficiently designed with complex curvatures as may be dictated by nautical considerations and the ribs can assume a more complicated shape at the rib to skin and rib to cross rib junctions by varying the shape of the foam cores. The double skin design gives double wall security against cargo leakage or contamination and affords high impact resistance, strength, and rigidity. Where double wall vessels are mandated or desired for petroleum or other cargo transport, the present vessel fills this need without the hazard of fumes accumulating in the enclosed space between the inner and outer hulls of a steel vessel. Also, there are no inaccessible areas to present a maintenance problem as with steel construction.

Also, due to the high insulative value of the foam cores and the relatively large distance between the inner and outer skin, the vessel structure acts as an efficient thermal barrier. By providing multiple layers of foam in a running or overlapped pattern forming longitudinal horizontal concrete ribs, the insulating properties of the system can be enhanced even further by requiring the length of the heat path through the concrete to increase. Concrete also has favorable cyrogenic properties, thus rendering the vessel adaptable to cyrogenic cargo, such as in container vessels.

Possible uses for the vessel include river and ocean going hopper and special purpose barges, ships, floating factory and power plant supports, pressure vessels, buildings, floating docks, floating drydocks, and drilling platforms. Also, segments of the vessel can be used for refrigerated storage buildings on water.

BEST MODE FOR CARRYING OUT THE INVENTION

Figure 1:
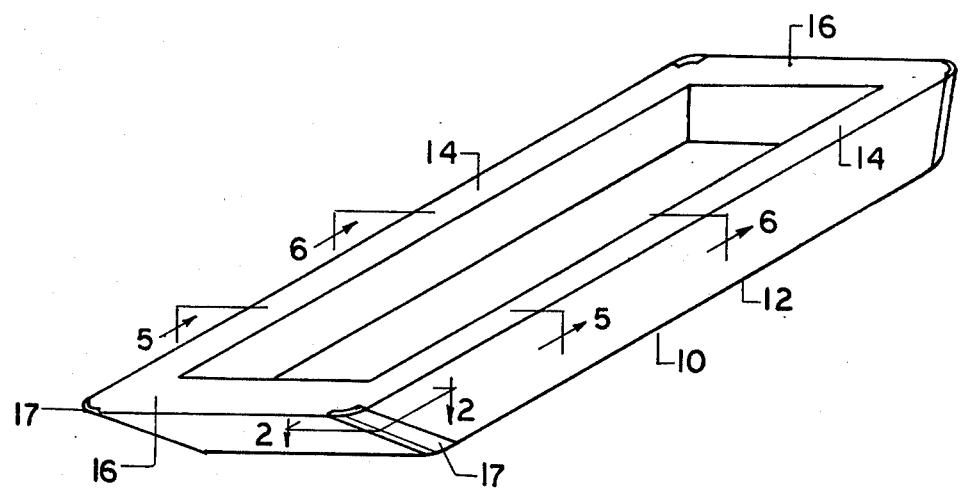
FIG. 1 is a reduced-scale perspective of a representative vessel constructed according to the principles of this invention.
Figure 5:
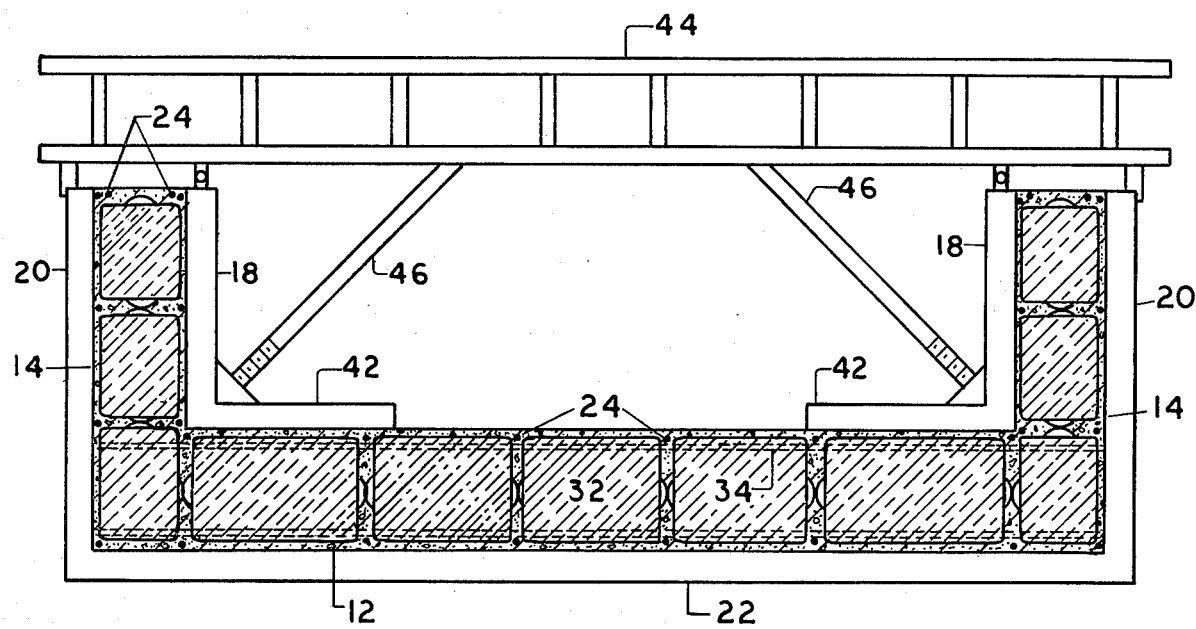
FIG. 5 is an enlarged section as seen along the line 5—5 of FIG. 1.
Figure 6:
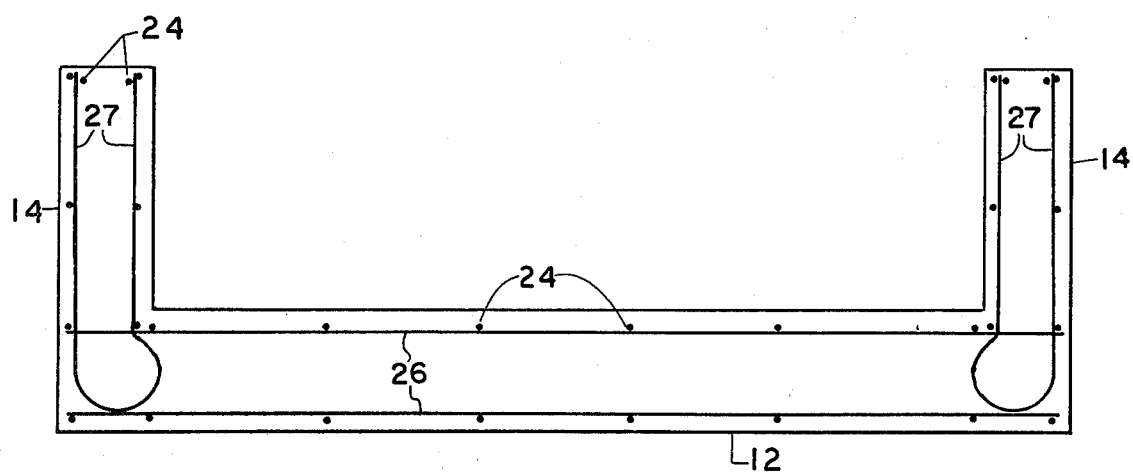
FIG. 6 is a similar section taken along the line 6—6 of FIG. 1 but omitting cross-hatching and the foam cores or blocks in the interests of simplicity.

The improved representative vessel is designated in its entirety at 10 in FIG. 1 and is shown as having a floor 12, side walls 14 and end walls 16, including metal armor 17 at the corners. How this basic structure is formed and integrated or unitized may be best understood by reference to FIG. 5, wherein interior and exterior forms 18 and 20, respectively, are shown, the exterior forms being cross-joined by a bottom floor form 22. In the construction of the vessel, the floor 12 is formed first, but prior to this there are provided pre-stressing steel tendons 24 in the floor 12 and sidewalls 14 and like lateral tendons 26 in the end walls. As best seen in FIG. 6, tendons or conduits 27 are placed in the sidewalls 14 and assume U-shapes. Tendons in the conduits may be post-tensioned to add to the strength and rigidity of the structure. These tendons are guided through appropriate holes in the form work, stressed, as by chucks (not shown) and properly anchored. Full stressing is not utilized at this time because of the need for safety of the workmen. At this time, post-tensioning ducts are located at suitable places, as at 28 and 30 (See FIG. 2).

As already stated, it is an important feature of this invention to render the vessel "sink proof", and this is accomplished by the utilization of a plurality of buoyancy elements or cores 32. At this point, it should be noted that lateral tendons 34 run crosswise of the floor to provide an overall "mesh" pattern as seen from above. The details of the buoyancy elements will be discussed below. The basic structure and method of construction will be covered first.

Figure 2:
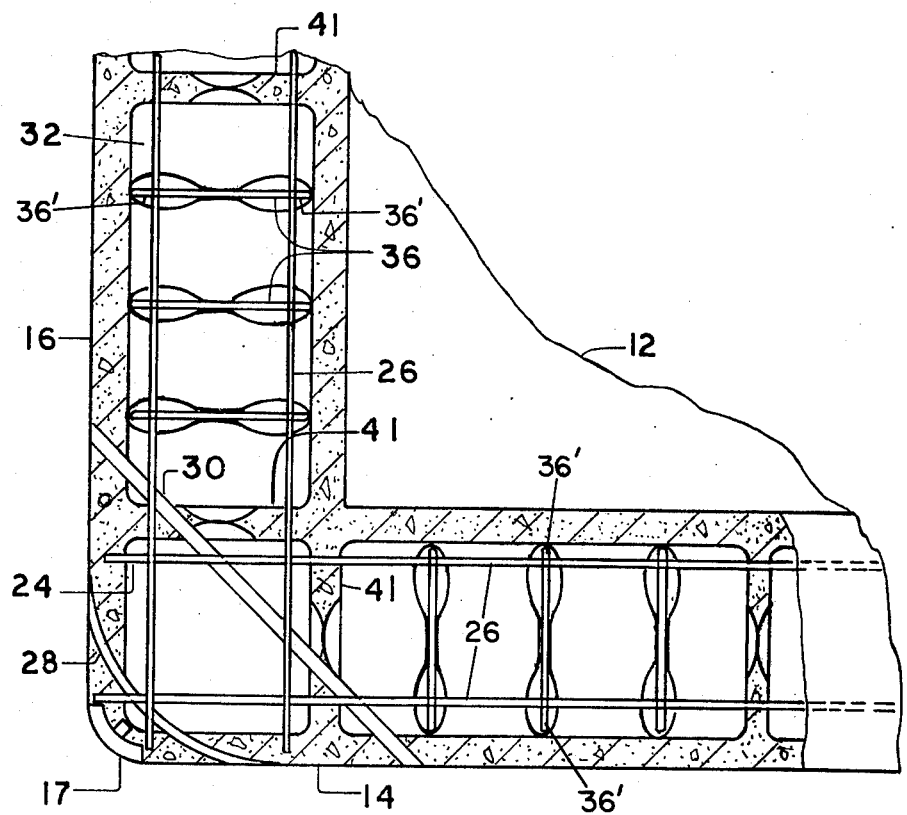
FIG. 2 is an enlarged fragmentary sectional view as seen generally in the plane indicated by the line 2—2 in FIG. 1.
Figure 3:
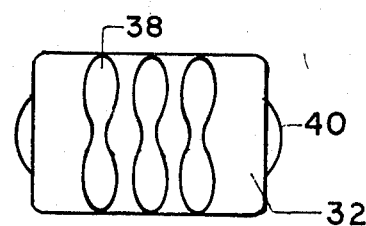
FIG. 3 is an elevation of one of the buoyancy/insulative elements.
Figure 4:
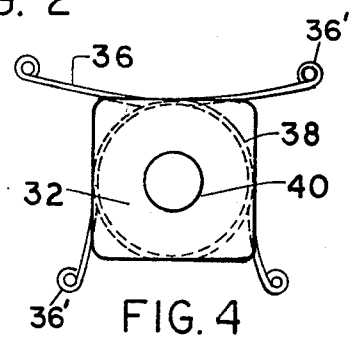
FIG. 4 is an end view of FIG. 3 but adds reinforcing tendons and shows the manner of supporting the element prior to the addition of the concrete.

Whatever embedded components are required will be added at this time, and the forms are ready for the addition of concrete. First, the tendons are stressed to final levels. The interior form is not in place until after the floor slab is finished. Concrete is placed initially only on the floor or base slab and is compelled to flow around and "bury" the buoyancy elements in the floor. These elements have been preliminarily supported by suitable wires or the like, preferably attached to adjacent tendons. Representative supporting wires are shown at 36 in FIGS. 2 and 4 with end portions 36' of the wires wrapped about the respective tendons. This step properly locates and spaces the elements 32 so that they are spaced from the walls of the form work. As best shown in FIGS. 3 and 4, each element is preferably in the form of a block, having valleys 38 for receipt of the support wires 36. Also, each element has at each end thereof a projection 40 adapted to abut a like projection on a neighboring element, thus spacing the elements apart end to end and affording space for the concrete to flow under and about the blocks to form integral ribs 41 (FIG. 2). Further, the valleys 38 provide concrete-receiving spaces and thus improve further the interlock among the elements and the concrete, adding materially to the structural strength of the hull and its floor and walls, it being understood that like elements are similarly arranged in the end and side walls of the vessel.

After sufficient concrete has been added to fill all the voids around the buoyancy elements and to constitute enough for the top skin of the floor, the floor slab is finished in any suitable manner, as by a finisher (not shown) typical of those used in concrete work on bridges, highways, etc. Settling of the floor will, of course, be augmented by internal and external vibration in any known manner. The floor finisher is removed and the interior forms 18 are placed. Each of these has a lower plate 42 adapted to rest on the top of the floor. Suitable truss means 44 spans the tops of the forms, and screws 46 operate between the truss means and the interior forms to properly locate the latter. The remainder of the concrete is now added, using known concrete supply means. After curing of the concrete, suitable post-tensioning steel (not shown) is threaded through the ducts or tubes 28 and 30, followed by stressing, grouting and coating, as with any known polymerizing protective coat.

FIG. 7

Figure 7:
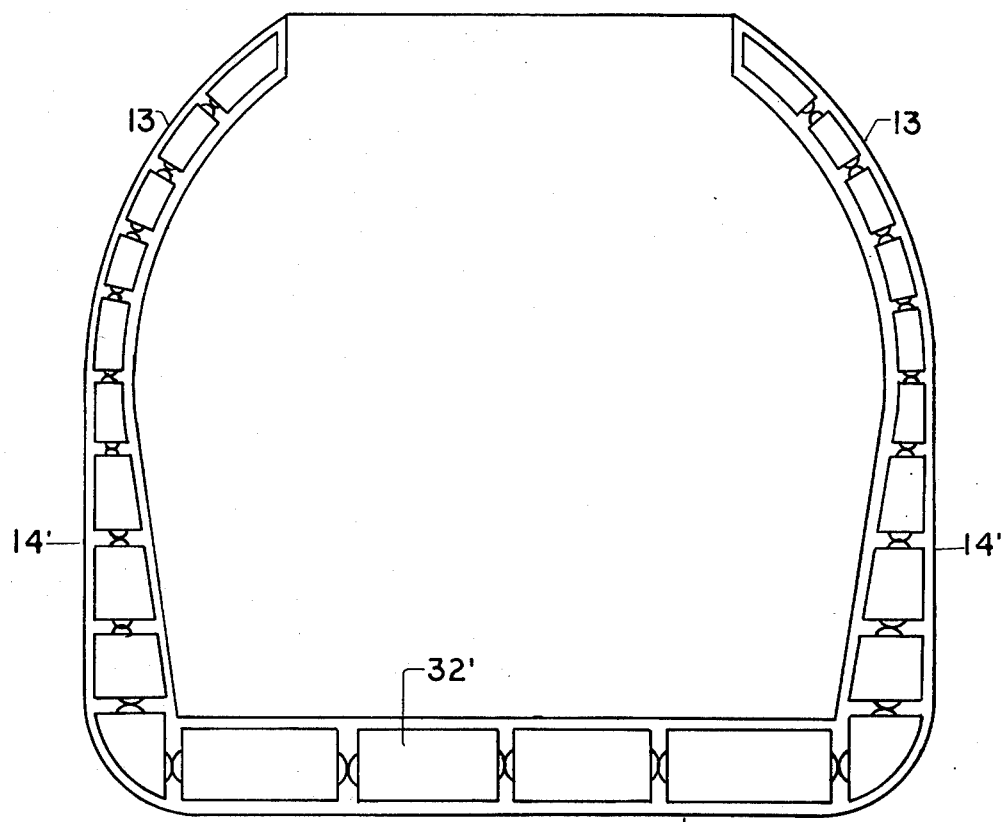
FIG. 7 is a section through a vessel of modified shape, having higher side walls, the foam cores again being omitted for the sake of simplicity.

This is a modified hull structure having a floor 12' and sidewalls 14', being supplemented of course by suitable end walls (not shown) as will be suggested by the end walls in the hull previously described. In this form of hull, the side walls are extended farther upwardly as at 13 to make the vessel adaptable to ocean-going use. All the elements and features previously described in conjunction with FIGS. 1-6 are applicable. As noted, the buoyancy elements have been omitted from FIG. 7 for clarity, but the locations therefor are readily seen at 32'.

FIG. 8

Figure 8:
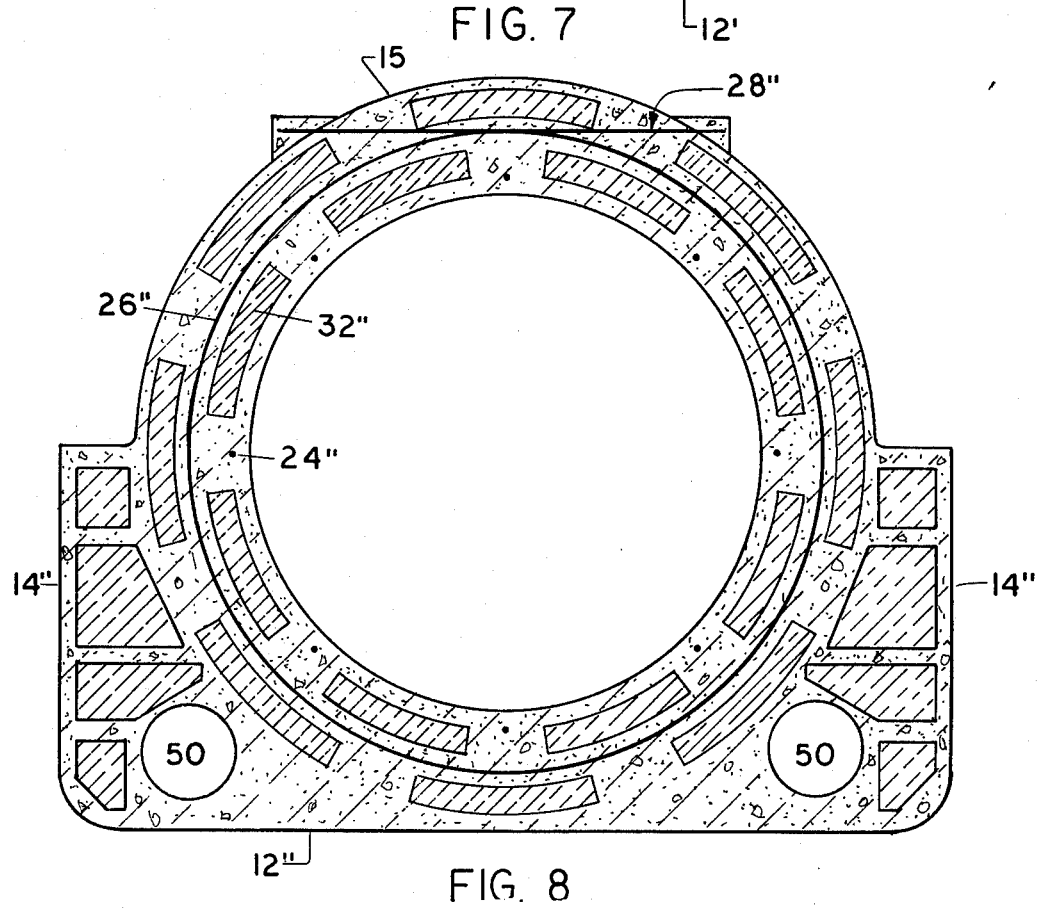
FIG. 8 is a section of further modification in which the hull is a cylindrical container having its circumferential wall provided with buoyancy/insulative elements.

This view represents a cross-section through a further modified form of hull, having a floor 12" and sidewall 14". In this case, the floor and sidewalls are augmented by an integral semi-circular portion 15 so that the hull acquires a hollow cylindrical shape, the interior of which is suitably adapted to contain a liquid cargo, which may be pumped into and out of the hull in any suitable manner and by an appropriate means (not shown). The buoyancy elements 32" here partake as well of insulative material, preferably arranged in a pair of circumferential rows or layers and "buried" in the concrete structure of the hull. As will be seen, the elements in each row are circumferentially spaced apart and the elements are arranged such that the elements in one row overlie the spaces between the elements in the other row. This increases the path of thermal flow between the interior and exterior of the hull. Tendons 24" run longitudinally of the structure and others, at 26" run circumferentially and are anchored such as at 28". If desired, longitudinal voids 50 may be provided in the floor of the hull. Here again, the components and features of the invention as set forth in conjunction with FIGS. 1-6 apply to FIG. 8.

INDUSTRIAL APPLICABILITY

As to the invention in general and as a guide to use to the invention, the following is included.

The foam blocks provide positive flotation and determine the shape and separation of the skins and ribs. The cores may be made of polystyrene, polyurethane, polyethylene or other foams. The shape needed could be produced either by injecting resins into molds, compressing preformed foam beads into a mold, hot wire cutting large blocks of foam in the proper shapes or combinations of these methods. Each block could be formed individually or multiple blocks could be formed with interconnections of foam to pass through the concrete rib areas. These interconnections would assist the positioning of the blocks and reduce the amount of concrete in the web. Also, interconnection could be made by doweling adjacent, individual cores together across the rib to aid in their positioning. Conceivably, other materials could be used as cores such as wood, steel, lightweight concrete or non-foamed plastics. These would either be solid or hollow.

If cargo or materials in the concrete could reach the core and could possibly decompose the foam material, a protective wrap of an unaffected material (plastic) could be sprayed, shrink wrapped or otherwise placed around the core before casting the concrete. The shape of the core would vary depending on such factors as distance between ribs, concrete and reinforcing used, position in the vessel, intended depth of concrete skin, desired shape of the ribs, whether horizontal ribs are needed for increased thermal resistance, and whether the cores are interconnected.

The intended primary construction material is a fluent, such as hydraulic cement concrete. However, any fluent which can be placed between the cores which subsequently hardens such as a polymer concrete or expansive cement concrete could be used. Lightweight aggregate concrete is not relied upon to lower a vessel's weight but is compatible with the system and can be used.

The steel reinforcing for the concrete advocated by the invention includes steel fibres, post-tensioned steel, pre-tensioned steel, mild (non tensioned) steel bars, wires, and wire mesh, and embedded steel armor. Depending on the particular vessel type and loading, the type and quantity of reinforcing can be interchanged. Non-steel reinforcing such as alkali resistant glass or plastic fibers could also be used.

A key to the improved vessel is that the exterior vessel dimensions reflect hydraulic and cargo criteria, rather than the method of construction. Hull forming need only to reflect the exterior and interior surfaces of the vessel because complicated or difficult forming of the ribs and undersides of the skins is done by the foam cores. By not requiring segmental construction, there are relatively few joints or surface irregularities to be smoothed by a surface treatment. Moreover, coating materials for damp-proofing, coloring, smoothing, and/or strengthening the concrete exterior are more easily applied because there are no ribs projecting from the interior of the hull and there are not unwanted spaces between the inner and outer skins.

Individual steps in the earlier described form procedure can be resequenced, deleted, added, or modified to suit the particular vessel under construction. Precautions against shrinkage cracking for large integral concrete castings follow normal construction procedures. The above procedure produces an integral unit. Depending on facilities and personnel available, portions of the vessel could be cast against previously cast portions of the vessel. Normal concrete building construction practices can be used. Also, individual segments of any multiple of a core unit could be cast and subsequently erected together to form a vessel. Normal segmental concrete construction practices can be used for erection such as those used for segmental concrete bridges.

The improved structure should be relatively maintenance free. Earlier designs of concrete ships and barges have demonstrated this and have shown there is no need for periodic drydocking for painting and cleaning whether used in salt or fresh water. A further decrease in maintenance should be realized if polymer impregnation or epoxy coatings are used on the hull. Also, high wear or impact surfaces can be armoured similarly to founded concrete marine structures.

All vessels are subject to accidental damage. If minor superficial damage occurs, comprised of penetrating the inner or outer skin, an epoxy compound and reinforcing cloth patch can be placed over the affected area whether it be above or below water. These epoxy compounds are commercially available. There would be no need for drydocking for minor repairs. More serious accidental damage could expose or break ribs and the reinforcing steel. Repair would then be similar to that demonstrated for a previously constructed floating drydock. All loose material would be removed, reinforcing would be connected and restressed if necessary, foam would be introduced into the appropriate areas if needed and the remainder of the void would be filled with a hydraulic cement concrete or a polymer concrete material. Hull finishing would be similar to original construction.

I claim:

1. A concrete marine vessel of the type including a floor, end walls and side walls, characterized in that at least the floor contains cast-in buoyant elements buried therein, said floor comprises interior and exterior skins of poured concrete spaced apart by and in cast-in contact with the elements substantially throughout the areas of said skins, each element is of non-circular cross-section and has at least one valley in each of its opposite skin-contacting surfaces for effecting composite, cast-in keyed connections with the respective skins, and each element is spaced apart from its neighbor lengthwise of the floor to receive the poured concrete as composite cross ribs integral with and rigidly uniting the skins.

2. A concrete vessel according to claim 1, further characterized in that the side walls are constructed substantially identically to the floor and are integral with the floor in cast-in relation.

3. A concrete vessel according to claim 1, further characterized in that the end walls are constructed substantially identically to the floor and are integral with the floor in cast-in relation.

4. A concrete vessel according to claim 1, further characterized in that the side walls and end walls are constructed substantially identically to the floor and are integrally united with the floor and with each other in cast-in relation.

5. A vessel according to claim 1, further characterized in that each element has at each end thereof a projection of smaller cross-section than the element, and each projection abuts the projection on a neighboring element to provide the aforesaid spaced apart relationship among the elements and to interlock with the cross ribs.

6. A vessel according to claim 1, further characterized in that each element is a one-piece block-like member of closed-cell foam material.

7. A vessel according to claim 1, further characterized in that metallic reinforcing members run both lengthwise and crosswise of the floor, and metallic cross ties cross-connect the members, certain of said ties being received in and interlocking with the element valleys.

8. A vessel according to claim 1, further characterized in that each element, is generally of rectangular cross-section and the valleys in each extend peripherally about the element for effecting further composite, cast-in keyed connections with the skins.

9. The method of constructing a concrete marine vessel having a floor, side walls and end walls, comprising erecting interior and exterior mold forms defining the floor, side walls, and end walls, placing a plurality of buoyant elements within the forms in at least the floor area, supporting the elements in spaced apart relation to both the interior and exterior forms, and pouring concrete into the forms to form and unitize the floor, side walls and end walls and simultaneously burying the elements in the floor.

10. The method of claim 9, including the step of adding concrete-reinforcing members to the form prior to pouring the concrete and supporting the buoyant elements on the reinforcing members.

11. The method of claim 9, including the further steps of placing a plurality of buoyant elements within the forms in the side wall areas and supporting said elements in the manner aforesaid.

12. The method of claim 11, including the further steps of placing buoyant elements in the forms within the end wall areas and supporting said elements in the manner aforesaid.

* * * * *